United States Patent
O'Rear et al.

(10) Patent No.: US 6,784,329 B2
(45) Date of Patent: Aug. 31, 2004

(54) OLEFIN PRODUCTION FROM LOW SULFUR HYDROCARBON FRACTIONS

(75) Inventors: Dennis J. O'Rear, Petaluma, CA (US); Gunther H. Dieckmann, Walnut Creek, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 33 days.

(21) Appl. No.: 10/043,345

(22) Filed: Jan. 14, 2002

(65) Prior Publication Data

US 2003/0135077 A1 Jul. 17, 2003

(51) Int. Cl.[7] .................................................. C07C 4/02
(52) U.S. Cl. ....................... 585/324; 585/324; 585/648; 585/650
(58) Field of Search ................................ 585/324, 648, 585/650

(56) References Cited

U.S. PATENT DOCUMENTS

| | | |
|---|---|---|
| 3,392,552 A | 7/1968 | Muller et al. |
| 4,179,474 A | * 12/1979 | Beuther et al. ............. 585/251 |
| 4,271,008 A | 6/1981 | Vogt et al. |
| 4,595,703 A | 6/1986 | Payne et al. |
| 5,371,308 A | 12/1994 | Gosselink et al. |
| 6,075,061 A | 6/2000 | Wittenbrink et al. |
| 6,180,842 B1 | 1/2001 | Berlowitz et al. |

FOREIGN PATENT DOCUMENTS

| | | |
|---|---|---|
| EP | 0 921 184 A1 | 6/1999 |
| WO | WO00/00571 | 1/2000 |

OTHER PUBLICATIONS

"Encyclopedia of Chemical Technology", *Kirk–othmer*, fourth edition, vol. 9, pp. 883–900.

Gruse et al, "Chemical Technology of Petroleum," *McGraw–Hill Book Company, Inc.,* New York, Toronto, London, (1960), pp. 344–348.

* cited by examiner

*Primary Examiner*—Thuan D. Dang
(74) *Attorney, Agent, or Firm*—Burns, Doane, Swecker & Mathis, L.L.P.

(57) ABSTRACT

Provided is a process for converting methane at a remote natural gas site into ethylene and other products. Methane is converted into syngas which is converted into a low-sulfur liquid hydrocarbon mixture containing less than 1 ppm sulfur via Fischer-Tropsch (FT) syntheses. The low-sulfur Fischer-Tropsch liquids are transferred from the remote site to an existing facility where a sulfur-containing compound or a sulfur-containing hydrocarbon mixture is added to avoid coking problems. The resultant blend of hydrocarbons which has a sulfur content of at least 1 ppm, is fed to a naphtha cracking unit and ethylene recovered.

9 Claims, No Drawings

OLEFIN PRODUCTION FROM LOW SULFUR HYDROCARBON FRACTIONS

BACKGROUND OF THE INVENTION

1. Field of the Invention

This invention relates generally to improved techniques for producing alpha-olefins from low sulfur hydrocarbon fractions and more particularly to the production of ethylene from low sulfur naphthas. More specifically, the invention relates to a process for converting a source of natural gas at a remote site into a low sulfur naphtha, transporting the low sulfur naphtha to a different facility and subsequently processing the low sulfur naphtha to produce ethylene.

2. Description of the Related Art

The conversion of hydrocarbons into olefins such as ethylene and propylene is an important industrial process which produces billions of pounds of olefins each year. Important sources of hydrocarbons for conversion include natural gas and refinery gases. In one industrial process, methane, which is a major component of natural gas, is steam reformed and/or partially oxidized to produce synthesis gas which is primarily composed of CO and $H_2$. Synthesis gas can be processed via known Fischer-Tropsch (FT) syntheses which involve converting the gas in the presence of a catalyst into hydrocarbon products suitable for conversion into olefins such as ethylene.

Natural gas is often plentiful in remote areas that are uneconomical to develop because of the lack of local markets for the gas or the high cost of transporting the gas to areas of high demand. One approach would be to convert the gas to a liquid chemical product for more cost-effective transportation to existing industrial facilities for further processing.

Ethylene is a valuable intermediate widely used in the production of such diverse materials as plastics, ethylbenzene, styrene, ethylene glycol, ethylene oxide, etc. Most of the ethylene produced world-wide is made by thermal cracking of light ethylene cracker feedstocks composed of hydrocarbons ranging from ethane to $C_5$–$C_{10}$ naphthas. If ethane is the feed, the unit is typically referred to as an ethylene cracker. If the feed is a mixture of ethane and propane, the unit is typically referred to as an EP or ethylene-propylene cracker since the unit produces ethylene and propylene. When the feedstock is a naphtha, the unit is called a naphtha cracker because of the ability to process heavier feeds. Water is conventionally added to the feeds in these units to lower partial pressure and minimize polymerization.

The yield of ethylene from a naphtha cracker depends upon the hydrocarbon content in the feed. Ethylene yields are highest when the feed is composed of high concentrations of paraffins, particularly linear paraffins. However, only limited supplies of highly linear paraffin feedstocks are available from petroleum refineries. When conventional naphthas (i.e. unrefined naphthas) are processed in the cracker units, the downstream facilities that separate the ethylene and propylene streams must be appropriately sized to compensate for the relative production of ethylene vs. heavier products. When highly linear paraffin hydrocarbon feeds such as Fischer-Tropsch naphthas are processed in naphtha cracker units, the ethylene yields may be so high compared to other products that the capacity of the facility to process the ethylene stream volume is sorely taxed. Also, the production of valuable by-products may be compromised.

It has also been observed that olefin cracker units suffer from furnace tube fouling caused by reaction between carbon and the metal of the furnace tube. The result is a decline in the heat transfer coefficient and the formation of soot and metal dust. Eventually the integrity of the furnace tube becomes so compromised that the tube needs to be replaced before rupturing. One means of minimizing this problem has been to add organic sulfur compounds to the feedstock. Because sulfur, even in small amounts, is poisonous to conventional Fischer-Tropsch catalysts, processing techniques have been employed to remove sulfur, including sulfur-containing compounds, upstream of the Fischer-Tropsch synthesis. As a consequence, Fischer-Tropsch distillates normally are essentially free of sulfur or sulfur-containing compounds. Processing these products in naphtha crackers could lead to furnace tube fouling.

One proposal for converting natural gas at remote sites to ethylene has involved converting natural gas into synthesis gas and then into methanol for transport to existing facilities for conversion into ethylene. The problem with this approach is that the production of methanol is expensive and the transportation of methanol would create an environmental hazard if spillage occurs. Furthermore, the proposal would necessitate the construction of new facilities to convert methanol to ethylene and propylene and existing naphtha crackers could not be used.

Information on the cracking of hydrocarbons to produce ethylene may be found throughout the patent and technical literature. Reference may be made to the following: "Encyclopedia of Chemical Technology", 4th edition, Kirk-Othmer, volume 9, pages 883 to 900; William A. Gruse and Donald R. Stevens, "Chemical Technology of Petroleum", 3rd Edition, McGraw-Hill, 1960, pages 344–348.

U.S. Pat. No. 6,075,061 discloses a process wherein natural gas is separated into first and second sulfur-containing hydrocarbon streams, the second stream de-sulfurized, subjected to a syngas generation, the syngas subjected to a hydrocarbon synthesis, and the hydrocarbons then subjected to hydrotreating and hydroisomerization in the presence of the first stream. U.S. Pat. No. 6,180,842 discloses stabilizing a Fischer-Tropsch derived distillate having a sulfur content of less than 1 ppm by adding a virgin distillate having a sulfur content of at least 2 ppm. Neither of these patents is concerned with ethylene production or furnace tube fouling.

Accordingly, a need exists for a process for producing ethylene and propylene by utilizing natural gas sources at remote sites for conversion of methane into low-sulfur liquid hydrocarbon products, and transporting the liquids to existing industrial facilities to be used as feedstocks in naphtha-crackers while not suffering a reduction in the production of propylene and heavier olefinic by-products and avoiding cracking problems caused by furnace tube fouling.

It is therefore an object of the present invention to develop an efficient process for producing ethylene at an industrial site utilizing methane obtained from a remote natural gas site.

It is another object of the invention to prepare alpha-olefins in naphtha cracker units using low sulfur paraffinic hydrocarbon feeds while avoiding furnace tube fouling.

It is still another object of the invention to produce feedstocks for naphtha cracker units comprising blends of low sulfur Fischer-Tropsch naphthas with sulfur-containing compounds or sulfur-containing petroleum naphthas which avoid the aforementioned problems.

These and other objects of the present invention will become apparent to the skilled artisan upon a review of the following description and the claims appended thereto.

SUMMARY OF THE INVENTION

These and other objects and objectives of the invention are attained by providing a process for producing ethylene comprising converting methane at a natural gas-producing remote site into synthesis gas, converting the synthesis gas via a Fischer-Tropsch synthesis into low sulfur paraffinic hydrocarbon liquids containing less than 1 ppm sulfur, transporting the liquids to a developed industrial site, adding a sulfur-containing compound or a sulfur-containing naphtha to the liquid to form a feedstock blend containing at least 1 ppm sulfur, converting the blend in a naphtha cracker unit to ethylene, and recovering the ethylene and other by-products therefrom. For it has been discovered that by converting methane at a remote site to a synthesis gas, and then converting the synthesis gas via Fischer-Tropsch procedures into a low-sulfur paraffinic hydrocarbon liquid containing less than 1 ppm sulfur, the low-sulfur naphtha can be effectively transported to a developed facility. Further, by then adding a sulfur-containing compound or a mixture containing a sulfur compound to the low-sulfur naphtha to provide a blend containing more than 1 ppm sulfur, coking problems are avoided. Thus, the addition of the sulfur-containing compound or mixture allows one to avoid coking problems and the reduction in the production of propylene and heavier by-products that would normally be observed with a Fischer-Tropsch naphtha alone. The result is an efficient and effective process for converting methane from a remote site into ethylene.

DESCRIPTION OF PREFERRED EMBODIMENTS OF THE INVENTION

In practicing the process of the invention, methane at a natural gas site is converted into Fischer-Tropsch liquid naphthas having less than 1 ppm sulfur, based on the content of any sulfur-containing compounds therein. Catalysts and conditions for performing Fischer-Tropsch reactions are well known to those of skill in the art, and are described, for example, in EP 0 921 184A1, the contents of which are hereby incorporated by reference in their entirety. The liquid naphthas are then transported to an existing industrial site. Fischer-Tropsch naphthas which are suitable for use in the present invention include those which are unrefined. These unrefined naphthas normally contain linear olefins, linear alcohols and smaller amounts of other linear and non-linear hydrocarbons. All of these compounds can readily be converted to ethylene. Since water is fed to the naphtha cracker, there is no need to remove oxygenates from the product.

Refined naphthas can be used in the present invention and offer some advantages. The preferred method of refining the naphtha is hydrogenation which includes hydrotreating, hydrocracking and hydroisomerization. In a preferred embodiment, the naphtha is hydrotreated which avoids the isomerization of the paraffins.

In the context of this invention, the following definitions are provided:

naphtha: a light hydrocarbon fraction used in the production of gasoline, solvents, and as a feedstock for ethylene production which contains material boiling above pentane, and typically has an end point below about 500° F.

syncrude: a hydrocarbonaceous mixture derived from a Fischer-Tropsch process that does not meet all specifications for a finished salable product such as jet fuel, diesel fuel, lube base stock, fully refined wax, gasoline and the like without further processing.

remote site: a location away from a refinery, market or other site where the distance of transportation is more than 100 miles, and preferably, more than 1,000 miles.

The naphtha from the Fischer-Tropsch process can be blended with other naphthas produced at the remote site such as by-product naphthas from hydrocracking of heavier streams (e.g. wax) and Petroleum-derived naphthas produced during gas recovery. A preferred embodiment of this invention is the blending of Fischer-Tropsch syncrude, which contains Fischer-Tropsch naphthas, with a sulfur-containing Petroleum-derived naphtha. The boiling range of the Petroleum-derived naphtha is selected so that it approximates the boiling range of the naphtha that will be fed to the naphtha cracker ($C_5$–$C_{10}$). By selecting a boiling range in this manner, the sulfur added to the syncrude will boil within the range of the naphtha and will not boil within the ranges of heavier products such as jet fuel, diesel fuel or lube base oil feed stocks. Accordingly, when the syncrude is shipped and then distilled at the developed site, a sulfur-containing naphtha will be recovered along with low-sulfur heavy products.

If the Petroleum-derived naphtha at the remote site contains material that boils in a range that is greater than that of the naphtha being fed to the naphtha cracker, the Petroleum-derived naphtha can be separated into a light fraction boiling within the range of the naphtha feed and a heavier product. The heavier product can then be treated to remove sulfur. A preferred method for treating this heavier product is by hydrogenation which includes hydrotreating, hydrocracking and hydroisomerization. Most preferably, this heavier product is mixed with heavy products from the Fischer-Tropsch facility and processed in the same unit.

By processing a highly linear hydrocarbon stream (e.g. Fischer-Tropsch naphtha) as a blend with conventional petroleum naphtha, any reduction in the production of propylene and heavier olefinic by-products that would normally be observed with a Fischer-Tropsch naphtha, would be avoided. The highly linear hydrocarbon stream can be mixed with a conventional petroleum naphtha and processed in an ethylene production unit or the two streams can be processed in separate ethylene production units. The products from these units can be combined and the ethylene separated from propylene and heavier olefinic by-products in a common facility.

One embodiment of the invention is illustrated by the following: a naphtha fraction is obtained from a Fischer-Tropsch processing unit. The fraction is composed predominantly of linear paraffinic hydrocarbons and has a sulfur content of below about 1 ppm. A sulfur compound, dimethyldisulfide (DMDS) is added to the fraction in an amount sufficient to raise the sulfur content of the fraction to above 1 ppm. The fraction is then processed in a naphtha cracker unit to recover ethylene.

Other sulfur compounds could be used instead of DMDS. These include methylethyldisulfide, diethyldisulfide, diethylsulfide and dipropylsulfide. DMDS and other disulfides can be recovered from a gas purification (sweetening) process used to purify the natural gas prior to conversion in the syngas generation and syngas conversion processes. These recovered disulfides can be blended with the Fischer Tropsch naphtha prior to shipment. Preferably, the amount of added sulfur compound should be sufficient to raise the sulfur content to about 10–50 ppm and most preferably about 50–100 ppm sulfur.

As indicated above, the naphtha fraction could contain oxygenated compounds which also would be converted in the naphtha cracker. For example, oxygenated compounds could be present in amounts such that the air-and water-free oxygen content is above about 100 ppm.

In another embodiment, a blend is prepared from two different hydrocarbon fractions obtained from Fischer- Tropsch units. One fraction is composed of a $C_5$–$C_{10}$ hydrocarbon mixture containing at least one sulfur compound such that more than one ppm sulfur is present in the mixture. The other fraction is composed of $C_{11}$–$C_{50}$ hydrocarbons containing less than one ppm sulfur. The blend is then forwarded to a naphtha cracker for processing.

Still another embodiment would involve the following procedure: a Fischer-Tropsch syncrude is recovered which contains $C_6$–$C_{50}$ hydrocarbons. A petroleum crude containing hydrocarbons selected from $C_5$, $C_6$, $C_7$ . . . $C_{10}$ and blends thereof is separated into a petroleum-derived naphtha which contains more than one ppm sulfur and a heavier petroleum-derived portion. The petroleum-derived portion is refined to reduce the sulfur content to below about 100 ppm, preferably below about 10 ppm and most preferably below about 1 ppm. The petroleum derived naphtha, the Fischer-Tropsch syncrude and the refined heavy petroleum-derived portion are blended together and forwarded to the naphtha cracker unit for processing.

A similar procedure to the above would further include the steps of separating the Fischer-Tropsch syncrude to form a Fischer Tropsch-naphtha containing hydrocarbons selected from $C_5$, $C_6$, $C_7$ . . . $C_{10}$ and blends thereof, as well as a heavier Fischer Tropsch-derived portion. The heavier Fischer Tropsch-derived portion would then be blended with the heavier portion of the petroleum crude and the blend refined to reduce the sulfur content to below about 100 ppm, preferably below about 10 ppm and most preferably below about 1 ppm.

The transportation of syncrude, naphtha and other hydrocarbonaceous products from a remote site to a site where the naphtha cracking is conducted and ethylene recovered can be effected using any common means of transport. This would includes marine tankers, rail cars, pipelines, trucks, barges and combinations thereof.

While the invention has been described with preferred embodiments, it is to be understood that variations and modifications may be resorted to as will be apparent to those skilled in the art. Such variations and modifications are to be considered in the purview and the scope of the claims appended hereto.

What is claimed is:

1. A process for producing ethylene comprising:

(a) preparing a Fischer-Tropsch syncrude;

(b) preparing a lighter naphtha fraction containing at least one $C_5$–$C_{10}$ hydrocarbon and having a sulfur content of at least 1 ppm;

(c) preparing a heavier fraction having a sulfur content of less than 100 ppm;

(d) blending said Fischer-Tropsch syncrude with the lighter naphtha fraction and the heavier fraction;

(e) feeding said blend to a cracker unit;

(f) converting the blend in the cracker unit to a product stream comprising ethylene; and, (g) recovering ethylene from the product stream of the cracker unit.

2. The process according to claim 1, wherein the cracker unit is a naphtha cracker.

3. The process according to claim 1, wherein the lighter naphtha fraction contains dimethyl disulfide.

4. The process according to claim 1, wherein the Fischer-Tropsch syncrude is derived from synthesis gas.

5. The process according to claim 4, wherein the synthesis gas is derived from natural gas.

6. The process according to claim 1, wherein the heavier fraction comprises $C_{11}$–$C_{50}$ compounds.

7. The process according to claim 1, where the blend fed to the cracker unit contains at least about 10 ppm sulfur.

8. The process according to claim 7, wherein said blend contains at least 100 ppm sulfur.

9. The process according to claim 1, which includes the steps of separating said syncrude into a naphtha fraction containing at least one $C_5$–$C_{10}$ hydrocarbon and a heavier fraction, blending said heavier fraction with a heavy fraction obtained from an Fischer-Tropsch syncrude, and refining the blend to reduce the sulfur content to below 100 ppm before mixing with said lighter naphtha fraction.

* * * * *